United States Patent [19]

Reinwall et al.

[11] Patent Number: 4,833,938
[45] Date of Patent: * May 30, 1989

[54] ROTARY MOTION DAMPENER

[75] Inventors: Ernest W. Reinwall, McHenry; Robert A. Hagan, Roscoe, both of Ill.

[73] Assignee: Elco Industries, Inc., Rockford, Ill.

[*] Notice: The portion of the term of this patent subsequent to Jun. 20, 2006 has been disclaimed.

[21] Appl. No.: 83,588

[22] Filed: Aug. 10, 1987

[51] Int. Cl.⁴ .............................................. F16F 15/10
[52] U.S. Cl. .......................................... 74/574; 74/572; 74/527; 74/531; 188/130
[58] Field of Search ....................... 74/574, 572, 573 R, 74/527, 531; 310/261; 188/83, 130

[56] References Cited

U.S. PATENT DOCUMENTS

| 2,158,535 | 5/1939 | Davidson | 188/130 |
| 2,445,607 | 7/1948 | Ghetto | 188/83 X |
| 2,560,015 | 7/1951 | Waldron | 188/83 X |
| 2,749,825 | 6/1956 | Hirasuna | 74/531 X |
| 2,779,211 | 1/1957 | Henrich | 74/574 |
| 2,795,037 | 6/1957 | Haushalter | 74/574 X |
| 2,837,923 | 6/1958 | Klarman | 74/574 X |
| 3,001,419 | 9/1961 | Hymans et al. | 74/574 |
| 3,136,178 | 6/1964 | O'Connor | 74/574 |
| 3,334,886 | 8/1967 | Caunt | 74/574 X |
| 3,606,802 | 9/1971 | Tsunoda | 74/574 |
| 3,650,361 | 3/1972 | Fossum | 74/574 X |
| 3,678,708 | 7/1972 | Ernst et al. | 74/574 X |
| 3,995,513 | 12/1976 | Amdall et al. | 74/574 |
| 4,463,933 | 8/1984 | Schreyer et al. | 188/83 X |
| 4,543,851 | 10/1985 | Gilbert | 74/531 |
| 4,598,328 | 7/1986 | Frangesh | 74/574 X |
| 4,678,276 | 7/1987 | Sekimoto et al. | 350/247 |
| 4,679,903 | 7/1987 | Kasahara et al. | 74/574 X |

FOREIGN PATENT DOCUMENTS

| 122982 | 5/1931 | Austria | 188/130 |
| 0246742 | 11/1987 | European Pat. Off. | 74/574 |
| 648646 | 12/1928 | France | 188/130 |
| 759386 | 2/1934 | France | 188/130 |

Primary Examiner—Vinh Luong
Attorney, Agent, or Firm—Leydig, Voit & Mayer, Ltd.

[57] ABSTRACT

A rotatable shaft carries a hard plastic disc located in a housing. A braking member in the form of a steel washer is sandwiched between the plastic disc and a washer-like elastomeric spring which is compressed against an axially facing wall of the housing. The spring urges the braking member frictionally against the disc to retard rotation thereof and dampen rotation of the shaft. By adjusting a screw, the disc may be shifted axially toward or away from the spring to change the compression thereof and thereby change the retarding torque applied to the disc.

8 Claims, 1 Drawing Sheet

ROTARY MOTION DAMPENER

BACKGROUND OF THE INVENTION

This invention relates generally to apparatus for dampening the motion of a first member relative to a second member during rotation of the first member with respect to the second member. More particularly, the invention relates to a motion dampener which is relatively small in size and which retards the rotatable member with torque of relatively small magnitude.

Many miniature motion dampeners of the foregoing type rely on the coaction of a rotary impeller with a viscous material (e.g., a heavy grease) contained in a housing. As the impeller rotates, it shears through the viscous material so as to apply a retarding torque to the impeller. A major disadvantage of motion dampeners of this type is that the viscous material tends to leak from the housing unless rather costly steps are taken to completely seal the housing.

Other relatively small motion dampeners operate "dry" and simply rely on the frictional force of one member against another to apply a retarding torque to the rotatable member. Dampeners of this type tend to be somewhat complex and most are incapable of applying a constant retarding torque to the rotatable member throughout the range of movement of the member. Moreover, many of the so-called dry dampeners still require some amount of lubricant for the components.

SUMMARY OF THE INVENTION

The general aim of the present invention is to provide a new and completely dry motion dampener which is relatively simple and inexpensive to manufacture, which imposes little or no breakaway torque on the rotary member at the start of rotation, and which thereafter imposes a substantially constant retarding torque on the rotary member throughout the entire range of movement of the rotary member.

A more detailed object of the invention is to achieve the foregoing by providing a motion dampener in which an elastomeric spring biases a braking member into frictional engagement with a disc on the rotary member; the spring, the braking member and the disc all having different frictional characteristics enabling the braking member to apply a substantially constant retarding torque to the disc.

The invention also resides in the provision of very simple means for adjusting the axial pressure between the rotary disc and the braking member so as to enable selective adjustment of the retarding torque applied to the disc.

These and other objects and advantages of the invention will become more apparent from the following detailed description when taken in conjunction with the accompanying drawings.

DETAILED DESCRIPTION OF THE PREFERRED EMBODIMENT

Figure 1:
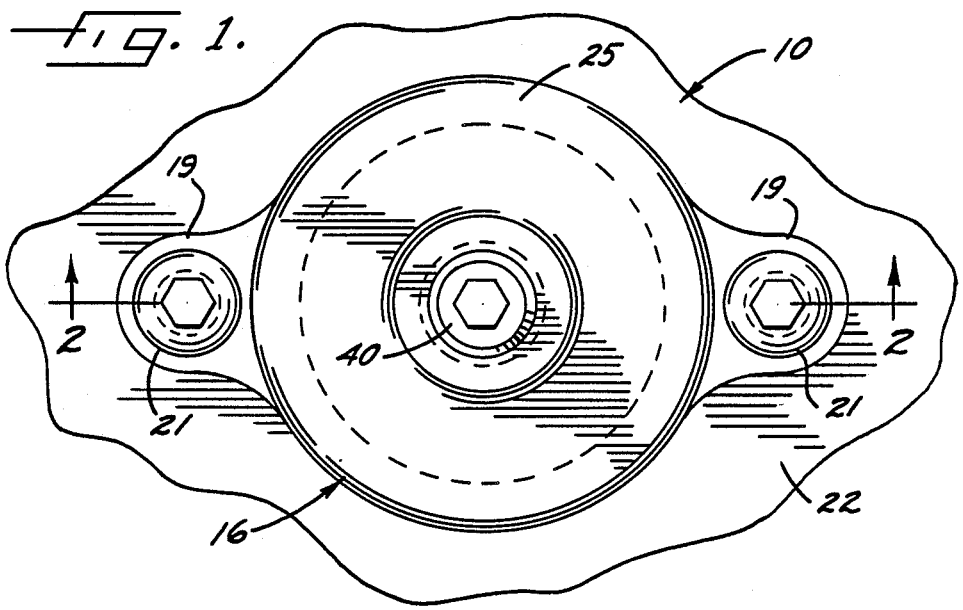
FIG. 1 is an end view of a new and improved rotary motion dampener incorporating the unique features of the present invention.

For purposes of illustration, the present invention has been shown in the drawings as embodied in apparatus 10 for dampening the motion of a rotary member 12 which herein has been shown simply as being an arm. The apparatus 10 includes a shaft member 14 connected to a hub 12A of the arm by a set screw 15 and supported to rotate by a housing member 16. The present housing 16 has a length of about $\frac{5}{8}''$ and a diameter of about $1''$.

Figure 2:
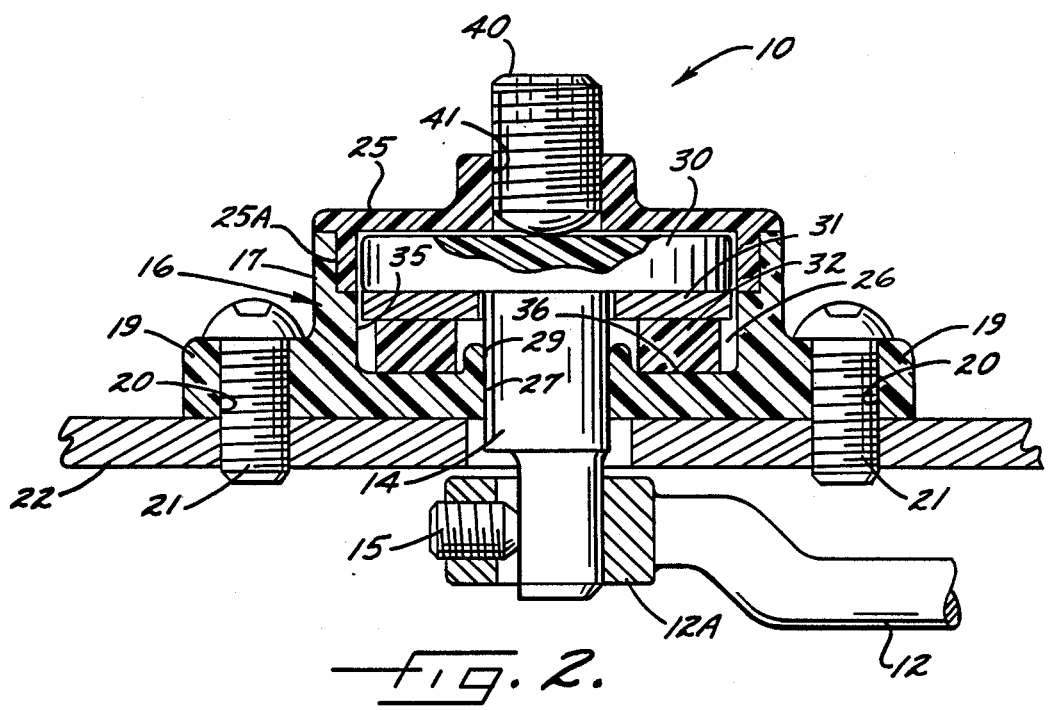
FIG. 2 is a fragmentary cross-section taken substantially along the line 2—2 of FIG. 1.

More particularly, the housing 16 includes a cup-shaped body 17 molded from a suitable hard plastic such as that designated by the trademark "LEXAN 44" and formed with a pair of diametrically spaced and radially projecting ears 19 having holes 20 for receiving screws 21 for securing the housing to a mounting base 22. The housing 16 further includes a cup-shaped cover 25 also made of "LEXAN 44" and having a tubular hub 25A (FIG. 2) telescoped within the body 17 and bonded to the body by ultrasonic welding. Together, the body 17 and the cover 25 define a cylindrical chamber 26 within the housing.

A hole 27 is formed through the end wall 28 of the body 17 and receives the shaft 14 with a free-running fit, the diametrical clearance between the shaft and the hole ranging from 0.004'' to 0.009''. For a purpose to be described subsequently, an annular collar 29 is formed around the hole 27 and extends axially into the chamber 26.

In accordance with the present invention, a disc 30 is joined to the shaft 14 and is adapted to be rotationally retarded by a braking member 31 which is urged axially against the disc by an elastomeric spring 32. The coefficient of friction between the disc 30 and the braking member 31 is significantly lower than that between the braking member 31 and the spring 32 and, as a result, the spring tends to hold the braking member rotationally stationary while causing the braking member to apply a frictional retarding force to the disc.

More specifically, the disc 30 is formed integrally with the inner end of the shaft 14 and, in this particular instance, both are made from a relatively hard but smooth and low friction plastic such as that designated by the trademark "DELRIN". The disc is cylindrical and its outer periphery is spaced from the radially facing wall 35 of the chamber 26 with a diametrical clearance ranging between 0.012'' and 0.016''. Accordingly, the shaft 14 and the hole 27 hold the outer periphery of the disc out of contact with the radially facing wall of the chamber.

Herein, the braking member 31 is in the form of a cylindrical washer located immediately adjacent the disc 30 and made of metallic material such as cold rolled steel plated with zinc. The braking washer 31 encircles the shaft 14 with radial clearance and its outer periphery is spaced radially inwardly from the radially facing wall 35 of the chamber 26.

The elastomeric spring 32 also is in the form of a cylindrical washer and, in this particular instance, is made of A60 polyurethane. The spring 32 is sandwiched between the braking member 31 and the axially facing wall 36 of the chamber 26 and is telescoped over the collar 29. As a result, the collar holds the inner periphery of the spring out of contact with the shaft 14. When the spring is in an uncompressed state, there is radial clearance between the outer periphery of the spring and the radially facing wall 35 of the chamber 26. The clearance is sufficiently great that the outer periphery of the spring does not contact the wall 35 when the spring is compressed axially.

Completing the dampening apparatus 10 is a set screw 40 which is threaded into a tapped hole 41 in the housing cover 25. The screw is adapted to be adjusted about an axis coinciding with the axis of the shaft 14 and, when tightened, the screw moves the disc 30 and the braking member 31 axially toward the spring 32 to compress the spring against the wall 36 and thereby increase the force with which the spring urges the braking member against the disc.

Because the coefficient of friction between the metallic braking member 31 and the relatively hard and slick plastic disc 30 is substantially lower than the coefficient of friction between the braking member and the soft spring 32, the spring holds the braking member in a rotationally stationary position when the shaft 14 and the disc 30 are rotated. At the same time, the compressed spring 32 urges the braking member 31 axially against the disc 30 and causes the braking member to frictionally dampen or retard rotation of the disc rather than permitting free wheeling thereof. Since the inner periphery of the spring 32 is held out of contact with the shaft 14 and since the outer periphery of the spring is spaced radially inwardly from the housing wall 35, the retarding torque applied to the disc and the shaft is developed solely at the interface of the braking member and the disc; neglecting, of course, the slight friction between the shaft and the hole 27 and between the disc and the screw 40. When the shaft first starts rotating, there is little or no breakaway torque but thereafter the coaction between the disc 30 and the braking member 31 results in a substantially constant retarding torque being applied to the disc. The magnitude of the retarding torque may be adjusted within a range of from zero to approximately 20 inch-pounds by changing the setting of the screw 40.

From the foregong, it will be apparent that the present invention brings to the art new and improved rotary dampening apparatus 10 which is of an extremely simple and inexpensive construction. In addition to the advantages pointed out above, the dampener 10 requires no lubrication and thus lends itself to use in "clean" environments. Moreover, the lack of a lubricant enables the dampener to maintain a substantially constant retarding torque over a wide range of temperatures.

While the disc 30 and the braking member 31 have been disclosed as being made of specific materials, those familiar with the art will appreciate that other materials could be used as long as the coefficient of friction between the disc and the braking member is significantly less than that between the braking member and the spring 32. For example, the disc 30 could be made of zinc-plated steel or other metallic material while the braking member 31 could be made of nylon impregnated with molybdenum.

We claim:

1. Apparatus comprising a housing, a shaft supported by said housing for rotation relative to said housing, and means for dampening rotation of said shaft relative to said housing, said housing defining a chamber having an axially facing wall, said means comprising a disc joined to and projecting radially from said shaft and rotatable in said chamber with said shaft, an elastomeric spring located in said chamber and engageable with the axially facing wall thereof, and a braking member sandwiched between said disc and said spring and biased against said disc by said spring, said braking member being rotatable relative to said disc and said spring, the coefficient of friction between said disc and said braking member lower than the coefficient of friction between said braking member and said spring whereby said spring causes said braking member to apply a frictional retarding force to said disc when said shaft is rotated relative to said housing.

2. Apparatus as defined in claim 1 in which said disc is made of a hard plastic material and said braking member is made of metallic material.

3. Apparatus as defined in claim 1 in which said spring and said braking member are annular members located in encircling relation with said shaft.

4. Apparatus as defined in claim 3 in which said chamber includes a radially facing wall, the inner and outer peripheries of said spring being out of contact with said shaft and the radially facing wall of said chamber at all times during rotation of said shaft relative to said housing whereby the retarding force applied to said first member is determined virtually solely by the retarding force developed between said disc and said braking member.

5. Apparatus as defined in claim 1 further including selectively adjustable means for shifting said disc axially relative to said spring thereby to enable adjustment of the force with which said braking member is biased against said disc by said spring.

6. Apparatus comprising a housing, a shaft supported by said housing for rotation relative to said housing, and means for dampening rotation of said shaft relative to said housing, said housing defining a chamber having an axially facing wall, said means comprising a disc joined to and projecting radially from said shaft and rotatable in said chamber with said shaft, an annular spring washer made of resiliently compressible elastomeric material supported in said chamber in encircling relation with said shaft and engageable with the axially facing wall of said chamber, an annular braking member supported rotatably in said chamber in encircling relation with said shaft, said braking member being sandwiched between said disc and said spring and being biased against said disc by said spring, said braking member being rotatable relative to said disc and said spring the coefficient of friction between said disc and said braking member being lower than the coefficient of friction between said braking member and said spring whereby said spring causes said braking member to apply a frictional retarding torque to said disc when said shaft is rotated relative to said housing, and selectively adjustable means for shifting said disc axially relative to said spring thereby to enable adjustment of the force with which said braking member is biased against said disc by said spring.

7. Apparatus as defined in claim 6 in which said adjusting means comprise a screw threaded into said housing and rotatable about an axis coinciding with the axis of said shaft, said screw being operable when tightened to force said disc axially toward said spring.

8. Apparatus comprising a housing, a shaft supported by said housing for rotation relative to said housing, and means for dampening rotation of said shaft relative to said housing, said housing being made of plastic and defining a chamber having an axially facing wall and a radially facing wall, said means comprising a hard plastic disc joined to and projecting radially from said shaft and rotatable in said chamber with said shaft, the outer periphery of said disc being spaced radially inwardly from the radially facing wall of said chamber, an annular spring washer made of resiliently compressible elastomeric material supported in said chamber in encircling relation with said shaft and engageable with the axially facing wall of said chamber, an annular braking member supported rotatably in said chamber in encircling relation with said shaft and made of metallic material, said braking member being sandwiched between said disc and said spring and being biased against said disc by said spring, said braking member being rotatable relative to said disc and said spring, the coefficient of friction between said disc and said braking member being lower than the coefficient of friction between said braking member and said spring whereby said spring causes said braking member to apply a frictional retarding torque to said disc when said shaft is rotated relative to said housing, the inner and outer peripheries of said spring being out of contact with said shaft at all times during rotation of said shaft relative to said housing whereby the retarding torque applied to said first member is determined virtually solely by the retarding torque developed between said disc and said braking member, and selectively adjustable means for shifting said disc axially relative to said spring thereby to enable adjustment of the force with which said braking member is biased against said disc by said spring.

* * * * *